United States Patent [19]

Muskat

[11] 4,175,787
[45] Nov. 27, 1979

[54] DOUBLE SHOULDER LAP SAFETY BELT

[75] Inventor: Kurt (Ulrich) Muskat, Hamburg, Fed. Rep. of Germany

[73] Assignee: Klippan GmbH Sicherheitsgerate, Hamburg, Fed. Rep. of Germany

[21] Appl. No.: 887,099

[22] Filed: Mar. 13, 1978

[30] Foreign Application Priority Data

Mar. 11, 1977 [DE] Fed. Rep. of Germany ....... 2710591

[51] Int. Cl.² ............................................. A62B 35/00
[52] U.S. Cl. .................................................... 297/484
[58] Field of Search ..................... 242/107.1; 297/385, 297/389, 386, 388

[56] References Cited

U.S. PATENT DOCUMENTS

| | | | |
|---|---|---|---|
| 2,898,976 | 8/1959 | Barecki | 297/386 X |
| 3,494,664 | 2/1970 | States | 297/385 X |
| 3,887,233 | 6/1975 | Garavaglia et al. | 297/389 |
| 3,890,002 | 6/1975 | Warmskessel | 297/385 |
| 3,971,569 | 7/1976 | Abe | 280/747 X |

FOREIGN PATENT DOCUMENTS

2625571 12/1977 Fed. Rep. of Germany ........... 297/389
1328336 8/1973 United Kingdom ...................... 297/389

*Primary Examiner*—James T. McCall
*Attorney, Agent, or Firm*—P. L. Henry; P. T. Kashimba; R. H. Criss

[57] ABSTRACT

Vehicle safety belt with two shoulder belt parts anchored behind the upper back rest area on the one hand and in the area at the bottom of the seat on the other and with a lap belt part releasable by means of a belt buckle and tongue, said belt lap part being anchored in the area at the bottom of the seat on each side of the occupant, characterized in that the lap belt (3,4) and the shoulder belts (1,2) are fastened to each other above their lower anchoring points (7 to 10; 41, 42) by guide members (6,6'; 40) disposed in the area of the line of contact (39) between seat cushion (36) and back rest (30). Both shoulder belt parts (1,2) have a single upper anchoring point (11) and all belt parts (1 to 4) are formed by one continuous finite belt.

6 Claims, 4 Drawing Figures

DOUBLE SHOULDER LAP SAFETY BELT

BACKGROUND OF THE INVENTION

The invention relates to a vehicle safety belt with two shoulder belt parts anchored above and/or behind the upper back rest area on the one hand and in the area at the bottom of the seat on the other and with a lap belt part releasable by means of a belt lock and tongue, said belt lap part being anchored in the area at the bottom of the seat on both sides thereof.

DESCRIPTION OF THE PRIOR ART

Safety belts designed as double shoulder/lap belt systems and having the above features are known from the German Offenlegungschrift 23 54 243, for example. Starting from the knowledge that the vehicle occupant is better protected, where more retaining belts are used to hold his body, an adaptation to low bucket seats and sports cars was attempted with the known belt system. The two shoulder belt parts are therefore conducted above and behind the upper back rest area through a slide rod fastened to the vehicle roof. From this slide bar, the one shoulder belt part runs forward across the occupant's shoulders, is then led through a guide element into a belt winder, both the guide element and the winding mechanism being disposed below on the vehicle floor. The other shoulder belt part is led through a deflection or pass-through fitting fastened to a lock tongue and thence as lap belt across the lap of the seated person to an anchoring point located on the vehicle floor on the same side and in the vicinity of the above mentioned guide element. A belt lock into which the lock tongues can be plugged is disposed on the side of the seat opposite the guide element and anchoring point.

The known belt system is formed by a continuous, finite belt length leading from the anchoring point mentioned through the pass-through and deflection fitting, through the slide rod at the vehicle roof down to the guide element into the belt winder. While the belt length can be adjusted for different body sizes by pulling out of the winding mechanism a more or less long piece of belt, the known system has the disadvantage that sliding of the buckled-up person through the lap belt, also called "submarining", cannot be prevented and also that a biomechanically favorable loading cannot be achieved. According to experience, the upper part of the occupant's body exerts a force less than half at the moment of the accident. In other words, under the stress at the moment of the accident the lap belt is subjected to a stronger pull than the shoulder belts. Now, if a continuous, finite length of belt is used as in the known case, the elongation is the same everywhere and, due to being stressed more, the lap belt will elongate more in relation to the two shoulder belts so that submarining occurs automatically. In addition, when seated, it is easily possible that the occupant will lengthen the belt part for greater comfort by pulling more belt through the deflection fitting. This danger is present also unintentionally so that the danger of submarining and the insufficient retaining effect of the lap belt are substantial. Other belt systems are known, for instance, from the German Offenlegungschrift 24 06 736, according to which a belt designed preferentially as a net, enclosing the upper part of the occupant's body from the neck area like a scarf, is provided, anchored backwardly at the shoulder on the one hand and crossing in front of the upper body part on the other, the two crossing parts being led laterally below the seat for anchoring. A lap belt anchored in the area at the bottom of the seat on both sides thereof extends across the occupant's lap so that this known system can be opened at the bottom on one side. Applying and particularly wearing this net-like belt is disagreeable so that the occupants will not use this belt at all. In addition, the known belt system has the disadvantage that either submarining throught the lap belt cannot be precluded due to its excessive elongation or the lap belt must subsequently be applied separately as a part of particularly little elongation. It has also been proposed already, for improved safety, to make the double shoulder belt and the lap belt one continuous piece of belt, joined together, forming a loop and being led from the anchoring point fastened behind the buckled-up occupant through a pass-through fitting mounted on the one side of the occupant's pelvis and through a lock tongue mounted on the other side of the occupant's pelvis back to the anchoring point. But, in order to inhibit the submarining effect under the lap belt more, it was necessary to see to it that the lap belt's elongation is less than that of the other parts of the belt loop, or else an additional belt part of little elongation was anchored laterally low next to the seat. While this accomplishes that the deflection/pass-through fitting and the belt lock are retained essentially fixed next to the pelvis of the buckled-up occupant at the instant of an accident and that the lap belt cannot be pulled to the abdominal area, splitting a belt up into parts of different elongation is costly and needs improvement.

SUMMARY OF THE INVENTION

It is an object of the invention to design a safety belt for vehicles of the kind described at the outset as multi-purpose belt so as to be adjustable by simple means so that it can also be installed in different vehicle types and that the stress experienced by the buckled-up person at the instant of an accident is biomechanically optimal.

According to the invention, this problem is solved in that the lap and the shoulder belts are interconnected above their lower anchoring points by guide members disposed in the area of the line of contact between seat cushion and back rest.

According to the invention, there is provided a vehicle safety belt system comprising: (a) two shoulder belt portions adapted to extend down over the shoulders of a vehicle occupant; (b) means for anchoring said shoulder belt portions behind the upper back rest area of the seat; (c) said shoulder belt portions extending downwardly through pass-through fittings on lower anchoring points disposed on each side of an occupant; (d) said belt portions extending upwardly from said pass-through fittings to form lap portions connected by a releasable connection between said anchoring points; (e) each of said shoulder belt portions and lap belt portions being fastened together at a point adjacent the line of contact between the seat cushion and the back rest portion of said passenger seat.

The shoulder belt portions or parts may be anchored above and/or behind the upper back rest area, which is to say that the respective upper shoulder belt end is fastened in a safety mount either via a static anchoring point preceded by dampers or via a so-called retractor or also via an automatic belt winder either at the hat hook or low behind the back rest, or laterally to a crossbeam above or below the top edge of the back rest or, if applicable, also inside the back rest. Where it is stated that the lower ends of the lap belt parts and of the shoulder belt parts are anchored in the lower area of the seat on both sides thereof, a loose interpretation applies, for the respective belt end may be fastened via a cable or a fitting directly to the vehicle floor, to the lateral crossbeam, below or also to the seat. Surprising advantages are achieved by fastening the lap and shoulder belts to each other in the area next to the occupant's hip on both sides. In particular, a part of the stress of the lower lap belt end is transferred by friction, among others, to the parallel lower ends of the shoulder belts. In other words, a double belt is available to the lap belt in the floor area on each side, which double belt obviously undergoes less elongation at the instant of an accident than the rest continuing as a single belt. In addition, the fastening points are thereby kept low, also at the accident moment, well next to the occupant's hip so that the lap belt cannot slip to the abdominal area and injure the occupant. The load on the shoulder belt parts is transmitted directly to the lower anchoring point so as not to stress the lap belt. As tests have already shown, the new design according to the invention guarantees a distinct displacement of the occupant's upper body part at maximum stress at the moment of the accident so that the head is positioned in front of the chest and the latter in front of the hip. This stresses the neck vertebrae more in tension, and the danger of an injury is reduced. It is no longer necessary to proportion the elongation of the lap belt properly to that of the shoulder belts so that lower manufacturing costs of the belt system can be achieved which may well be termed a mass production item.

The invention is further advantageously characterized by making the guide member an adjustment fitting through which both belts parts are led jointly, one on top of the other, and by having the lower anchoring points of the belt parts contain pass-through fittings. While in the simplest case the double shoulder lap belt according to the invention may have rings as guide members sewn to the lap belt, for instance, it is particularly advantageous, however, if the guide member according to the above measure is an adjustment fitting, or also a locking fitting, if applicable. This makes the immediate adjustment of the belt length possible on each side so that occupants of different body size can also be buckled up securely in a taxi with little manipulation. The adjustment fitting in combination with the pass-through fitting also makes possible an adjustment from a child's belt to an adult's belt and from one vehicle type to another without having to acquire special parts to replace no longer fitting parts.

The new safety belt according to the invention can be used as simple lap belt; as double shoulder lap belt; as single shoulder lap belt; for the transportation of loads and baby carriers; and with safety seats.

It is particularly advantageous when, according to the invention, both shoulder belt parts have a single anchoring point on top. This may, for instance, be an automatic windup mechanism, the advantages and conveniences of which are known. The use of an automatic safety device permits further improvement of adjustability because even more belt length is available in the belt winder for lengthening the belt by means of the adjustment fittings. It is expedient to have both shoulder belt parts run into a single automatic belt winder on top. The always dreaded submarining effect is further inhibited in that the shoulder belt parts only are effected by the automatic winder while the lap belt parts are not. Tests have shown that a ring as guide member, joining shoulder belt part and lap belt part to each other, as well as the pass-through fittings, deflection and adjustment fittings represent a positive connection at the instant of stress in an accident. Whereas adjustability of the belt parts led through the fittings is possible without problems, the said fittings can be considered fastening points under maximum stress.

The adjustment fitting may be imagined as a kind of buckle with a center bar, the two belts coming from underneath the buckle being conducted, according to the invention, through the one slot ahead of the center bar, laid over the center bar and back through the second slot behind it. Both in this novel belt conduction and in the known type of belt conduction the locking effect of these guide members may be assumed. In addition to the advantages of the known belt arrangements in adjustment fittings, a positive connection of the belt parts at the moment of stress can further be obtained by the novel belt conduction.

As in known belt arrangements, a shortening or lengthening can also be achieved; for example, either the shoulder belt length can be shortened at the expense of the lap belt length, or vice versa, by pulling the individual belt ends. Or the fitting itself can be moved away from the anchoring point, for instance, by shifting the belt on both belt ends. One type of belt conduction is arranged so that one belt is laid over the center bar, enclosing it and is sewn to the same belt, while the other belt is led up through the one slot, gripping over the center bar and is led back down through the second slot. When comparing the known and the novel belt conduction, a surprising difference with unexpected advantages becomes apparent, namely, in the novel conduction, the positive connection of the belt parts at the moment of stress, although both belt ends are superposed across the center bar.

Very short structural lengths of the safety belt system are achieved due to these adjustment possibilities, as required for a safety seat, for instance.

It is also expedient, according to the invention, for all belt parts to be formed by one continuous, finite length of belt. It may be imaged here that the length of belt is sewn to the lock, thus starting there, is conducted down to the anchoring point, deflected there and led to the belt winder behind the occupant's nape, to come out of it again and across the other shoulder downward, going through the pass-through fitting fastened to the floor on the other side, where it is reoriented and connected as the other lap belt part to the lock tongue via an adjustment fitting and out of the latter. The safety belt according to the invention has the advantage of always being handy because both the lock tongue and the belt lock buckle are lying on the seat, yet easy adjustability to different body sizes is possible. If no guide members are used as fastening elements between the shoulder belt and the lap belt parts, shock absorbers, such as by sewing and forming loops in the belt, must be provided in the section between the automatic belt winder and the shoulder belt running across the occupant's shoulders. The use of the guide members according to the invention, in particular of the adjustment fittings with the novel belt conduction, make these extra sewing operations superfluous. Rather, the belt need be sewn, in fact, at a single point only, namely at the lock tongue. This evidently reduces manufacturing costs.

It is of particular advantage here if the lap belt itself is separable according to the invention and if an adjustment fitting is provided on the lock tongue.

Other advantages, features and applications of the present invention follow from the specification below:

DETAILED DESCRIPTION OF THE INVENTION

Figure 1:
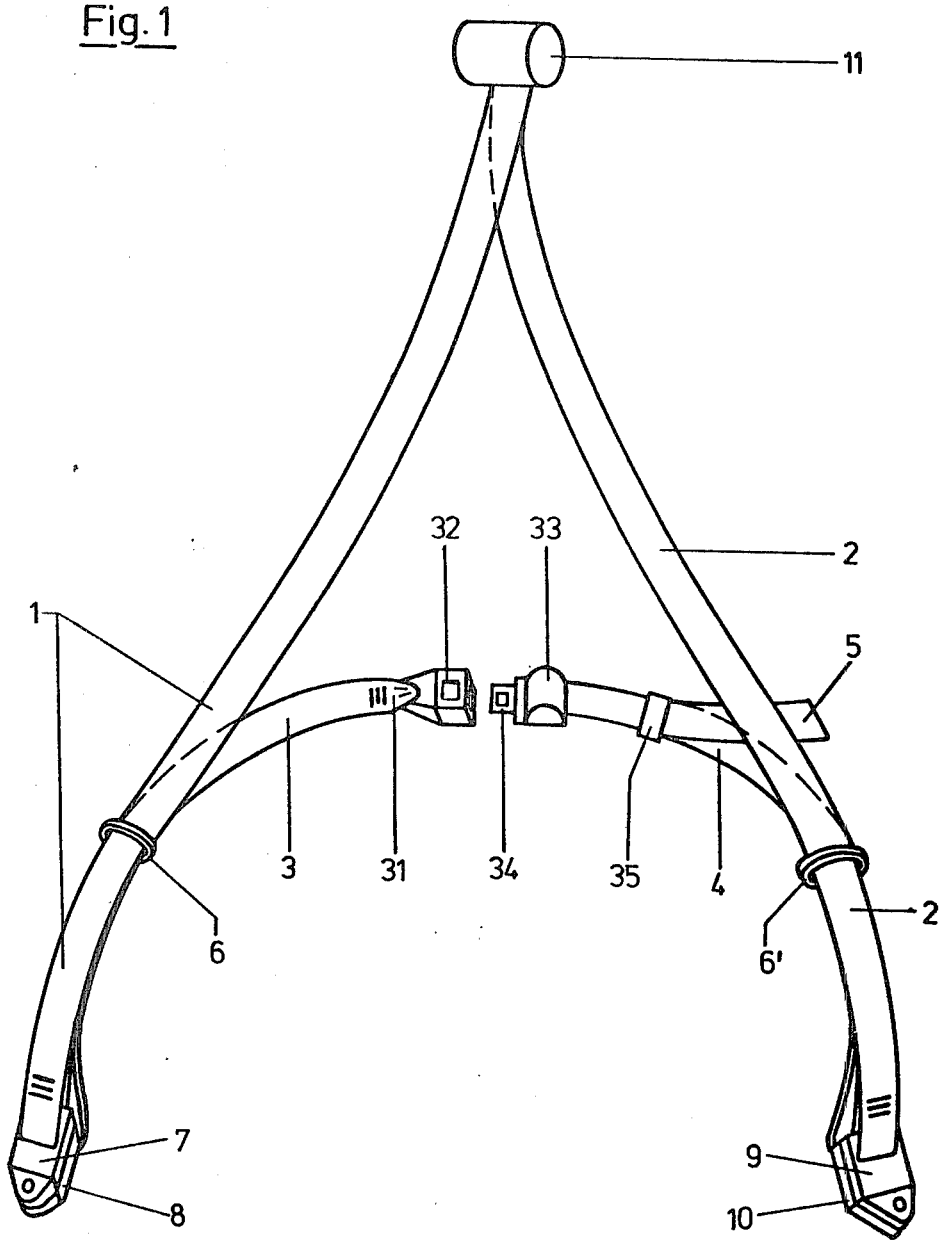
Figure 2:
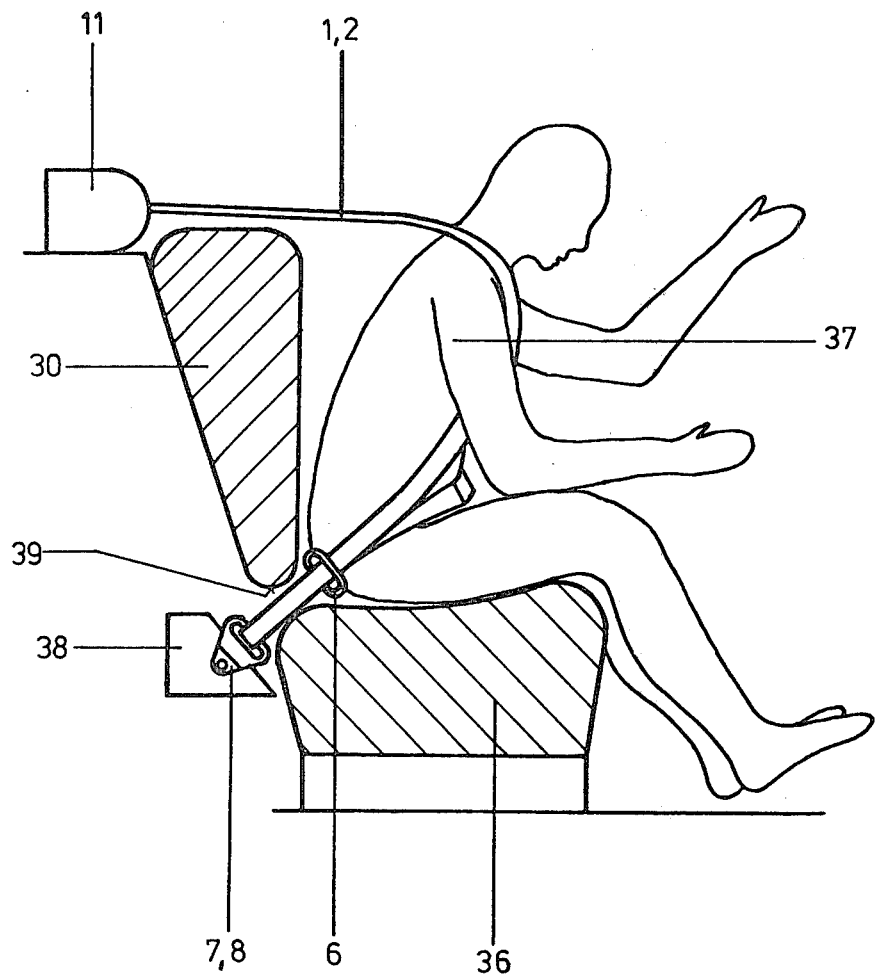
Figure 3:
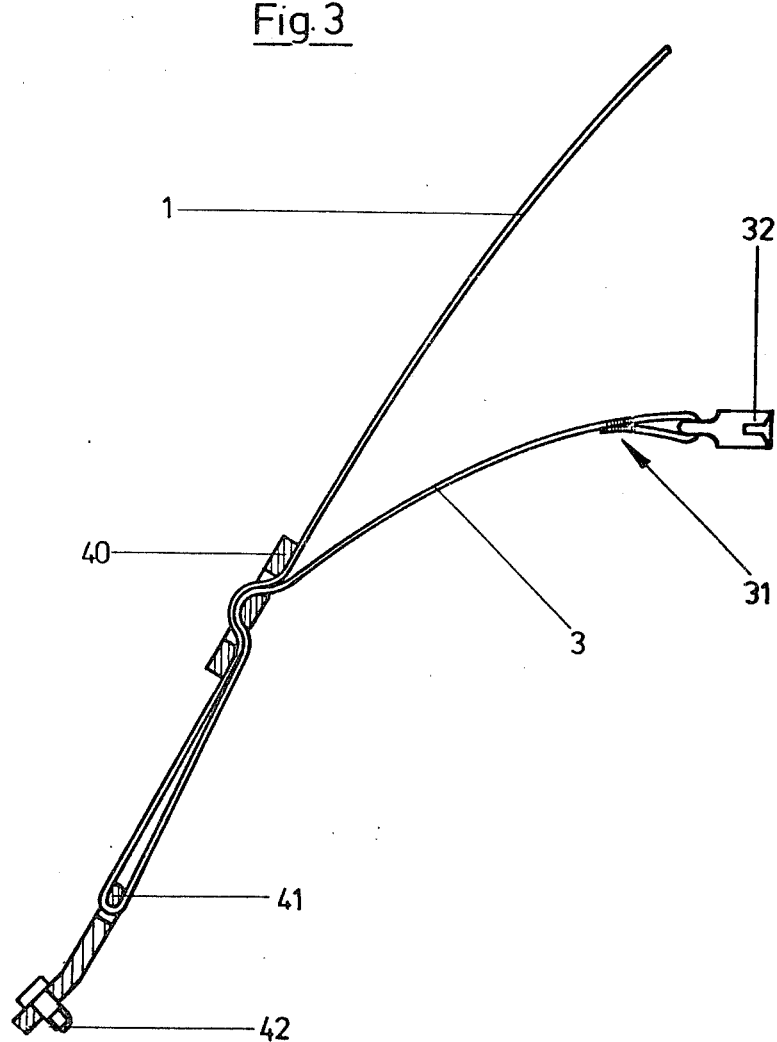
Figure 4:
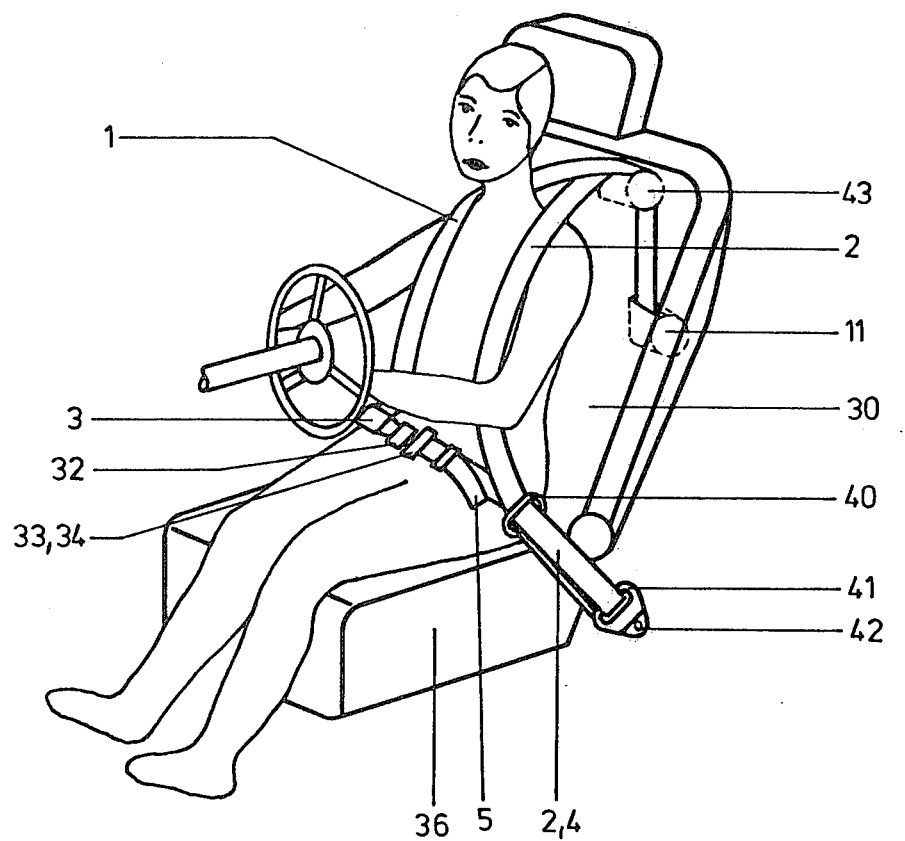

In the drawings:

FIG. 1 shows, in perspective representation, the safety belt according to the invention as double shoulder/lap belt in the position for installation;

FIG. 2 a side view of the new safety belt in buckled condition with a person leaning forward;

FIG. 3, schematically, a broken-off view of a part of the belt system shown in FIG. 1, such as of the left lower end per FIG. 1, but with an adjustment fitting as guide member, and FIG. 4, perspectively indicated, a safety seat with the new double shoulder/lap belt.

Illustrated in FIGS. 1 and 2 is a first embodiment of the vehicle safety belt having two shoulder belt parts 1 and 2 anchored, above and behind the upper area of the back rest 30, in the automatic winding mechanism 11 which, in another embodiment, may also be designed as adjustment fitting possibly preceded by a damper. At the opposite end on the bottom the shoulder belt parts 1 and 2 are anchored to the fittings 7 and 9. Next the the latter are mounted other fittings 8 and 10 for the two lap belt parts 3 and 4, a single fitting each also being usable, if applicable, instead of the two fittings 7,8 and 9,10, respectively. The lap belt part 3 is sewn to the belt lock 32 at 31. In a manner known per se, the other lap belt part 4 is merely passed through and clamped in an adjustment or locking fitting 33 attached to the lock tongue 34, emerging on the free side as end 5 which may also be fixed in the back by a holding strap 35.

Also shown in FIG. 1 are the guide members 6, 6', designed in this embodiment as rings sewn to the lap belt parts 3 and 4, respectively, at the points indicated.

Shown in FIG. 2 is the occupant 37, buckled up on the seat cushion 36 and able, when using the automatic belt winder 11, to lean forward at will or rest backwards against the back rest 30 so that the shoulder belts 1 and 2 are always pulled with a certain tension against the upper part of his body by the windup spring. Shown on the crossbeam 38 of the vehicle is the pair of anchoring points 7 and 8, and spaced from these anchoring points is the ring 6, attached to the lap belt so that the guide member designed in the form of ring 6 is disposed in the area of the line of contact 39 between the seat cushion 36 and the back rest 30.

When using the new double shoulder/lap belt, the occupant 37 sits down on the seat cushion 36 between the lap belts 3 and 4, slings the two shoulder belt parts 1, 2 over his shoulders and pushes the lock tongue 34 into the belt lock 32. At the accident instant, a greater load is transmitted to the lap belt 3,4 than to the shoulder belt parts 1,2 and due to friction, a part of the load on the lap belt is transmitted to the lower portion of the shoulder belts 1,2, starting from the fixed points 6,6' downward to the anchoring points 7 to 10. The parallel lower belt parts 2 and 4 on the one hand and 3 and 1 on the other act as considerable reinforcement in order to prevent the rings 6,6' from pulling up and thus the belt lock 32 from sliding into the abdominal area.

Another embodiment is shown in FIG. 3. While the overall design is the same as in the embodiment per FIGS. 1 and 2, the rings 6,6' are replaced by adjustment fittings 40 and the anchoring points 7 to 10 by pass-through/deflection fittings 41. In FIG. 3 may again be seen the belt lock 32 to which one lap belt part 3 is sewn at 31 which is passed through the adjustment fitting 40 in the novel manner described at the outset, is reoriented by the pass-through fitting 41 anchored on the bottom at 42, is again conducted upwards and again through the adjustment fitting 40, at which point it can already be considered as being the shoulder belt part 1. Especially in this embodiment, the biomechanically desirable position at the moment of maximum stress is attained even better in advantageous manner, in addition to better adjustability. Utilizing the lower belts, the adjustment fittings 40 shown in FIG. 3 are used on each side, which as guide members on both sides of the shoulder belts 1, 2, provide the connection to the two lap belt parts 3,4 on the left and right side of the occupant's hip. In the event of an accident, the high load moment is thus transmitted jointly by the two belt parts 1 and 3 from the adjustment fitting 40 downward to the anchoring point 42 so that both belts are stressed jointly in the area below the adjustment fitting 40. It is evident that the automatic winder 11 has no effect on the lap belt 3,4. The novel belt configuration may also be seen in FIG. 3, both belts lying flat on top of each other, being conducted jointly upwards through the first slot, laid across the center bar and conducted downwards again through the other slot. At the moment of maximum stress this adjustment fitting acts as conforming fixed point.

In FIG. 4, the double shoulder/lap belt is shown in the embodiment of FIG. 3 in connection with a safety seat with seat cushion 36 and back rest 30. The anchoring screw 42 and the pass-through fitting 41 may be seen, through which the belt parts 2,4 are led to run through the adjustment fitting 40 in the manner described above. From there, the lap belt is led via tongue and belt lock across the occupant's lap and the left shoulder belt 2 upwards over the shoulder via a roller 43 to the automatic winder 11 mounted in the back rest 30.

Having thus described the invention in rather full detail, it will be understood that these details need not be strictly adhered to but that various changes and modifications may suggest themselves to one skilled in the art, all falling within the scope of the invention as defined by the subjoined claims.

What is claimed is:

1. A vehicle safety belt system for a passenger seat having a back rest and seat cushion comprising:
    (a) a continuous length of seat belt webbing forming two shoulder belt portions adapted to extend down over the shoulders of a vehicle occupant and a lap belt portion comprising a releasable buckle and tongue interconnection;
    (b) a first anchoring means for anchoring the upper portion of said shoulder belt portions behind the upper back rest area;
    (c) a second anchoring means for anchoring the lower portion of said shoulder belt portions on each side of the seat adjacent the bottom thereof, said second anchoring means having pass-through fittings;
    (d) a third anchoring means for anchoring the lower portion of said lap belt portion on each side of the seat adjacent the bottom thereof, said third anchoring means having pass-through fittings; and (f) a fastening and guiding means for fastening said lap belt portion and said shoulder belt portions to each other above said second and third anchoring means and for jointly guiding said lap belt portion and said shoulder belt portions such that one belt portion lies on top of the other, said fastening and guiding means being disposed in the area of the line of contact between the seat cushion and the back rest.

2. A vehicle safety belt system as recited in claim 1, wherein said fastening and guiding means is adjustable.

3. A vehicle safety system belt as recited in claim 2, wherein said first anchoring means comprises a single upper anchoring point for said shoulder belt portions.

4. A vehicle safety belt system as recited in claim 3, wherein said second anchoring means and said third anchoring means comprise a single anchoring means.

5. A vehicle safety belt system as recited in claim 4, wherein said lap belt portion further comprises an adjustable fitting adjacent said tongue.

6. A vehicle safety belt system as recited in claim 1, wherein said fastening and guiding means is an adjustable friction guide means.

* * * * *